US012360283B2

(12) United States Patent
He et al.

(10) Patent No.: US 12,360,283 B2
(45) Date of Patent: Jul. 15, 2025

(54) METHOD OF QUANTITATIVE EVALUATION ON STRUCTURAL DISTURBANCE CHARACTERISTICS OF PRESENT IN-SITU GEO-STRESS IN DEEP SHALE GAS RESERVOIRS

(71) Applicant: CHENGDU UNIVERSITY OF TECHNOLOGY, Chengdu (CN)

(72) Inventors: Jianhua He, Chengdu (CN); Hucheng Deng, Chengdu (CN); Ruolong Ma, Chengdu (CN); Kesai Li, Chengdu (CN); Yong Li, Chengdu (CN)

(73) Assignee: CHENGDU UNIVERSITY OF TECHNOLOGY, Chengdu (CN)

( * ) Notice: Subject to any disclaimer, the term of this patent is extended or adjusted under 35 U.S.C. 154(b) by 471 days.

(21) Appl. No.: 17/953,496

(22) Filed: Sep. 27, 2022

(65) Prior Publication Data

US 2023/0031116 A1 Feb. 2, 2023

(30) Foreign Application Priority Data

Sep. 26, 2021 (CN) .......................... 202111131086.8

(51) Int. Cl.
*G01V 20/00* (2024.01)
*E21B 49/00* (2006.01)

(52) U.S. Cl.
CPC ............ *G01V 20/00* (2024.01); *E21B 49/006* (2013.01); *E21B 2200/20* (2020.05); *G01V 2210/6169* (2013.01)

(58) Field of Classification Search
None
See application file for complete search history.

(56) References Cited

U.S. PATENT DOCUMENTS 11,754,735 B2 * 9/2023 Crook ................. G01V 20/00
73/783
2003/0125878 A1 * 7/2003 Bakulin ................. G01V 1/30
702/14

(Continued)

FOREIGN PATENT DOCUMENTS

CN 103913774 A 7/2014
WO 2016041189 A1 3/2016

OTHER PUBLICATIONS

Gan Tian et al., "Experimental study on the control effect of ground stress on the damage of coal seam mining floor", E3S Web of Conferences 79(4):02012 (2019), pp. 1-7; Xi'an Research Institute of China Coal Technology & Engineering Group, Xi'an City, Shaanxi Province, China.

(Continued)

*Primary Examiner* — Lina Cordero

(57) ABSTRACT

Disclosed is a method of quantitatively evaluating structural disturbance characteristics of present in-situ geo-stress in deep shale gas reservoirs, including: measuring geomechanics key parameters of key wells in different tectonic zones within a study area; performing interpretations of single-well profile rock mechanics and continuity of the in-situ geo-stress in magnitude and direction; establishing a geological model; performing anisotropic sequential Gaussian stochastic simulation to obtain three-dimensional (3D) heterogeneous rock mechanics parameter field distribution; performing prediction of distribution of geo-stress states in the study area, and calculating a stress structural index and stress disturbance factor of the target layer and a rotation degree of a maximum horizontal principal stress; and performing quantitative evaluation on an in-situ geo-stress structural disturbance and mapping.

7 Claims, 11 Drawing Sheets

(56) References Cited

U.S. PATENT DOCUMENTS

| | | | | |
|---|---|---|---|---|
| 2004/0176911 A1* | 9/2004 | Bratton | .................... | G01V 1/50 |
| | | | | 702/6 |
| 2010/0121623 A1* | 5/2010 | Yogeswaren | .......... | G01V 1/284 |
| | | | | 703/2 |
| 2010/0238764 A1* | 9/2010 | Pistre | ....................... | G01V 1/30 |
| | | | | 367/25 |
| 2011/0182144 A1* | 7/2011 | Gray | ........................ | G01V 1/50 |
| | | | | 367/75 |

OTHER PUBLICATIONS

Jianhe Li et al., "Study on Excavation Disturbance Characteristics of High Ground Stress Soft Rock Tunnels", IOP Conference Series: Earth and Environmental Science, vol. 455, The 6th International Conference on Environmental Science and Civil Engineering Jan. 4-5, 2020, pp. 1-9, Nanchang, China.

Zhang Zhiqiang et al.,"Sensitivity Analysis of Rock Mechanical Parameters in Permanent Shiplock of Three Gorges Project", Journal of Northeastern University, Dec. 2000, vol. 21, No. 6, pp. 637-640; School of Resources and Civil Engineering, Northeastern University, Shenyang 110006, China.

Yang Shuxin et al., "A study of regression analysis and numerical simulation on modern tec-stress field in China mainland", Rock and Soil Mechanics, Oct. 2003 vol. 24 Supp., pp. 357-360; Institute of Crustal Dynamics, SSB, Beijing 100085, China.

Hao Hongrui et al., "Variable Range Optimization in Geostatistics", Computer & Digital Engineering, 2017 vol. 45, Issue 6, pp. 1180-1186; School of Earth and Space Sciences, Peking University, Beijing 100871.

* cited by examiner

| The relationship among three principal stress magnitudes | Regional radial extension state | Extension state | Extension-shear state | Simple shear state | Shear-compression state | Compression state | Regional radial compression state |
|---|---|---|---|---|---|---|---|
| | The intermediate principal stress >The maximum principal stress >The minimum principal stress | The intermediate principal stress >The maximum principal stress >The minimum principal stress | The intermediate principal stress =The maximum principal stress >The minimum principal stress | The maximum principal stress >The intermediate principal stress >The minimum principal stress | The maximum principal stress >The intermediate principal stress =The minimum principal stress | The maximum principal stress >The intermediate principal stress >The minimum principal stress | The maximum principal stress >The intermediate principal stress >The minimum principal stress |
| The ratio of the maximum principal stress to the intermediate principal stress | 0.675 | 0.825 | 0.875 | 1.010 | 1.075 | 1.200 | 1.400 |
| The ratio of the minimum principal stress to the intermediate principal stress | 0.650 | 0.750 | 0.775 | 0.825 | 0.875 | 0.925 | 1.000 |
| The stress structural index | 0 | 0.5 | 1.0 | 1.5 | 2.0 | 2.5 | 3.0 |

Fig. 8

METHOD OF QUANTITATIVE EVALUATION ON STRUCTURAL DISTURBANCE CHARACTERISTICS OF PRESENT IN-SITU GEO-STRESS IN DEEP SHALE GAS RESERVOIRS

CROSS-REFERENCE TO RELATED APPLICATIONS

This application claims the benefit of priority from Chinese Patent Application No. 202111131086.8, filed on Sep. 26, 2021. The content of the aforementioned application, including any intervening amendments thereto, is incorporated herein by reference in its entirety.

TECHNICAL FIELD

This application relates to oil exploration and development, and more particularly to a method of quantitatively evaluating structural disturbance characteristics of present in-situ geo-stress in deep shale gas reservoirs.

BACKGROUND

Currently, the estimation of the modeling and distribution of the present in-situ geo-stress field is commonly performed by using the geophysical inversion and the three-dimensional (3D) finite element numerical simulation technique. Nevertheless, the geophysical inversion relies too heavy on the acquisition quality of 3D seismic data and requires the integration of logging data and geological data to predict the distribution of the present in-situ geo-stress field, mainly including the prediction of the crustal stress based on the pre-stack elastic parameters for AVA/AVAZ inversion, and the calculation of the in-situ geo-stress based on the pore pressure properties of the formation.

Due to the limitation of the 3D geological model and calculation workload, the model accuracy, especially the 3D rock mechanics structure and the grid scale size of the fault, is hard to satisfy the needs of exploration and development. Moreover, the frequently distribution of the in-situ geo-stress field commonly presents near the fault and fold within the tectonic zone, resulting in the in-situ geo-stress state of the well site near the fault block or the fold having a large variability with the regional stress-field characteristics. The decoupling effect of the stress sharply reduces the prediction accuracy of the stress field in the complex tectonic zone. For this, the present disclosure provides a method of quantitative evaluation of structural disturbance characteristics of present in-situ geo-stress in deep shale reservoirs to solve the defects existing in the prior art.

SUMMARY

An object of the present disclosure is to provide a method of quantitatively evaluating structural disturbance characteristics of present in-situ geo-stress in deep shale gas reservoirs, in which based on the analysis of the decoupling mechanical mechanism of the in-situ geo-stress field within a complex tectonic zone, the finite element theory is fully integrated and analyzed with geological, geophysical, drilling, fracturing, and laboratory core testing data to form an optimized three-dimensional (3D) finite element constrained prediction technology of in-situ geo-stress field under complex tectonic disturbances, establish a fine modeling and quantitative evaluation method for the strong-anisotropy geo-stress field of the shale in the deep complex tectonic zone, and form an intuitive and convenient 3D mapping method for the structural disturbance and orientation rotation of the in-situ geo-stress. Moreover, the method provided herein provides more accurate reference for the horizontal well deployment and hydraulic fracturing modification design in the deep shale gas reservoirs.

Technical solutions of the present disclosure are described as follows:

The present disclosure provides a method of quantitatively evaluating structural disturbance characteristics of present in-situ geo-stress in deep shale gas reservoirs, comprising:

(S1) measuring geomechanics key parameters of key wells in different tectonic zones within a study area;

(S2) performing interpretations of single-well profile rock mechanics and continuity of the in-situ geo-stress in magnitude and orientation through combination of full-wave logging, multi-caliper logging, imaging logging, extraction of anisotropic transverse wave velocity from a cross-well seismic profile, and interpretation of magnitude of geo-stress through a hydraulic fracturing construction curve;

(S3) establishing a geological model by using Petrel software based on stratigraphical model, tectonic surface model, and overlying strata model of a target layer;

(S4) performing anisotropic sequential Gaussian stochastic simulation to obtain three-dimensional (3D) heterogeneous rock mechanics parameter field distribution based on constraint of an elastic parameter of 3D seismic attribute inversion in the study area, and test values of rock mechanics parameters of well sites in different tectonic zones and the interpretation of the single-well profile rock mechanics;

(S5) performing mesh generation by using adaptive mesh refinement; inputting a final numerical model into a Flac3D simulation and calculation software for simulation and prediction of distribution of in-situ geo-stress states in the study area; and calculating a stress structural index of the target layer and a rotation degree of a maximum horizontal principal stress;

wherein the stress structural index is calculated by:

$$T\gamma = (m+0.5) + (-1)m(\gamma-0.5);$$

wherein $$\gamma = \frac{S_2 - S_3}{S_1 - S_3};$$

$S_1$ represents a maximum principal stress; $S_2$ represents an intermediate stress; $S_3$ represents a minimum principal stress; m=0 when S2>S1>S3; m=1 when S1>S2>S3; and m=2 when S1>S3>S2; and the stress structural index ($\gamma$) determines the three principal stress structure of a deep reservoir, i.e., stress states, comprising regional radial extension state, extension state, extension-shear state, simple shear state, shear-compression state, compression state, regional radial compression state; and the rotation degree of the maximum horizontal principal stress is the difference between an azimuth of the maximum horizontal principal stress in the local stress disturbance area and an azimuth of the in-situ maximum horizontal principal stress in an undeformed area; and a positive rotation degree indicates clockwise rotation and a negative rotation degree indicates counterclockwise rotation; and (S6) taking an in-situ geo-stress structural disturbance factor as a parameter to quantitatively characterize 3D stress structural disturbance in the study area; wherein the in-situ geo-stress structural disturbance factor is calculated by:

$$\mu = \frac{\gamma'}{\gamma_i} \times 100\%;$$

wherein $\gamma'$ represents a stress structural index of a site in the study area after geo-stress disturbance caused by a local structure deformation; $\gamma_i$ represents an in-situ regional stress index of a gentle tectonic zone (i.e., an undeformation zone), and when the in-situ geo-stress structural disturbance factor is less than 1, the farther the in-situ geo-stress structural disturbance factor is from 1, the stronger the positive geo-stress disturbance caused by the local structure, and when the in-situ geo-stress structural disturbance factor is greater than 1, the farther the in-situ geo-stress structural disturbance factor is from 1, the stronger the negative geo-stress disturbance caused by the local structure; and performing graded and partitioned evaluation on present in-situ geo-stress states and the maximum horizontal principal stress direction characteristics existing in a deep strata within a complex tectonic region; and displaying three-directional stress structures disturbance characteristics of the complex tectonic region on a map In some embodiments, the geomechanics key parameters comprise rock mechanical properties, and three principal stress magnitudes and orientations.

In some embodiments, in the step (S3), the geological model is established by adopting an idea of from a regional structure to a local structure and then to a single-well structure.

In some embodiments, in step (S4), for a fault, 3D rock mechanics heterogeneous assignment within the fault is completed based on an equivalent elastic parameter assignment method for a fracture-containing rock medium.

In some embodiments, in step (S5), after the final numerical model is input into the Flac3D simulation and calculation software, loading boundary, mode, and initial size are set, and well site stress magnitude and orientation are used as fitting points for simulation; and meanwhile, a graphic processing unit (GPU) cloud computing platform is used for the prediction of distribution of the in-situ geo-stress states.

In some embodiments, in step (S5), the simulation and prediction of distribution of the in-situ geo-stress states are performed by the Flac3D simulation and calculation software through steps of:
  establishing a 3D geological model based on a geological element distribution map of the target layer;
  defining structural unit types and material property parameters;
  generating a mesh mathematical model; and performing accuracy evaluation on the mesh mathematical model;
  loading boundary conditions and external loads; and
  solving the mesh mathematical model followed by result display and map output.

In some embodiments, the geological model is built by using the Petrel software; and the mesh mathematical model is generated by using a Rhinoceros modeling software, and is solved by using the Flac3D software.

Compared to the prior art, the present disclosure has the following beneficial effects.

The present disclosure precisely predicts the present in-situ geo-stress state of deep wells and the distribution characteristics of the 3D in-situ geo-stress field after being disturbed by complex tectonics based on the refined geological model and the elastic parameter constraint of 3D seismic attribute inversion in the study area, which provides scientific suggestions for the drilling direction, wellbore trajectory design, and selection of completion and fracturing section of deep shale gas horizontal wells in complex tectonics, improves the optimal design of horizontal well drilling, well completion, and hydraulic fracturing modification, avoids engineering risks during drilling construction such as well wall collapse, well leakage, and casing deformation, and improves the stability of well wall and quality of completion.

BRIEF DESCRIPTION OF THE DRAWINGS

To illustrate the technical solutions in the embodiments of the present disclosure or in the prior art more clearly, the accompanying drawings used in the description of the embodiments or the prior art will be briefly described below. Presented in the accompanying drawings are only some embodiments of the present disclosure, and other drawings can be obtained by one of ordinary skill in the art from these drawings without paying any creative efforts.

FIG. 8 schematically shows a relationship among stress state, stress structural index and three-principal stress magnitude according to an embodiment of the present disclosure;

DETAILED DESCRIPTION OF EMBODIMENTS

Figure 1:
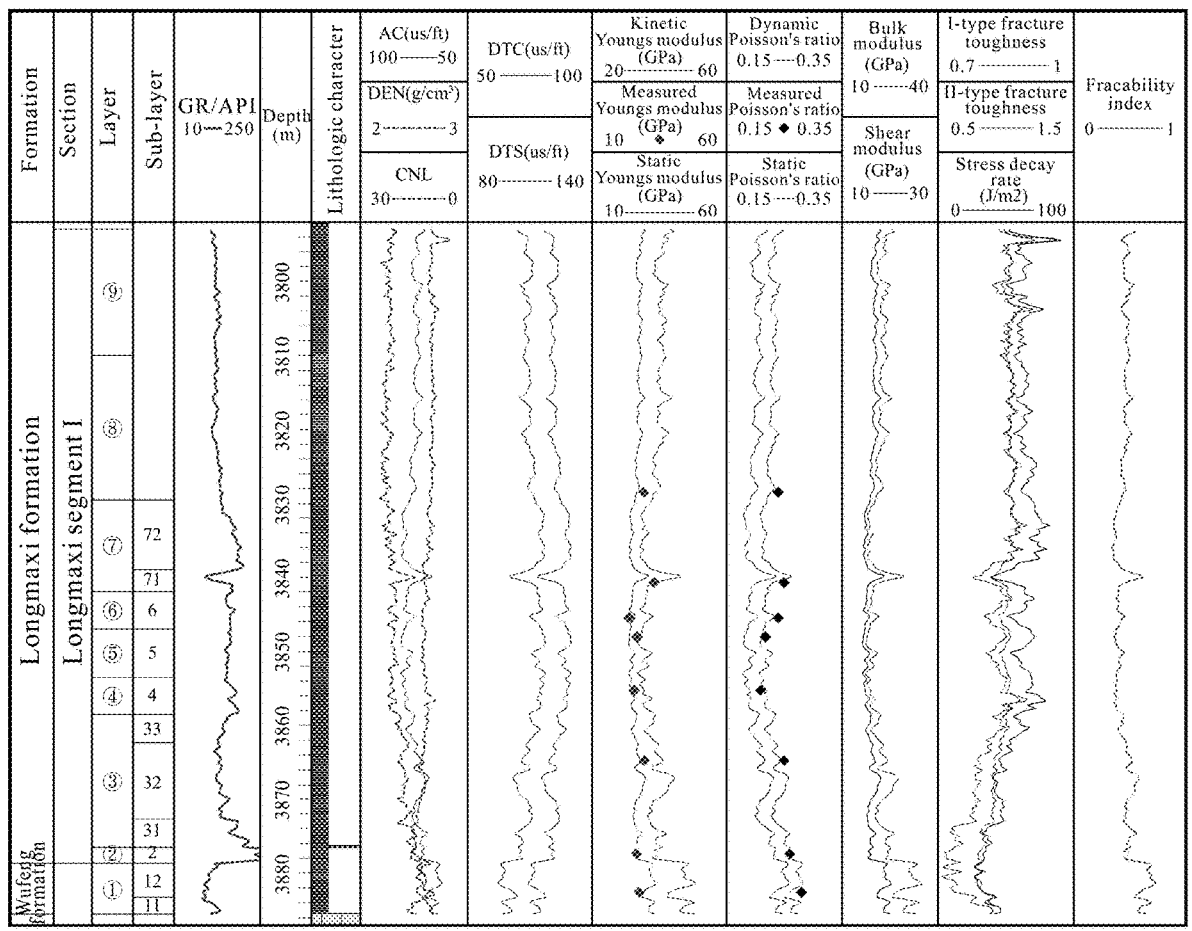
FIG. 1 shows interpretation results of a continuous profile of single-well rock mechanics parameters according to an embodiment of the present disclosure.

To make the technical solutions of the present disclosure clearer, the technical solutions in the embodiments of the present disclosure will be clearly and completely described below with reference to the accompanying drawings. Described below are only some embodiments of the present disclosure, which are not intended to limit the disclosure.

Based on the embodiments in the present disclosure, all other embodiments obtained by one of ordinary skill in the art without paying creative work shall fall within the scope of the present disclosure.

It should be noted that the orientation or positional relationships indicated by the terms such as "center", "upper", "lower", "left", "right", "vertical", "horizontal", "inside", and "outside" is based on what is shown in the accompanying drawings, and are merely intended to facilitate and simplify the description of the present disclosure, rather than indicating or implying that the device or element referred to must have a particular orientation, be constructed and operated in a particular orientation. Therefore, these terms should not be construed as a limitation of the present disclosure. Furthermore, the terms, such as "first", "second", "third", and "fourth", are merely used for description and are not intended to indicate or imply relative importance.

Embodiment 1

An embodiment illustrated in FIGS. 1-4 and 6-12 provides a method of quantitatively evaluating structural disturbance characteristics of present in-situ geo-stress in deep shale gas reservoirs, which includes the following steps:

(S1) Geomechanics key parameters of key wells in different tectonic zones within a study area are measured, including rock mechanical properties, and three principal stress magnitude and orientation, and results are shown in Tables 1-3.

TABLE 1

Rock mechanics experimental results of Longmaxi formation shale in the study area

| Samples | Well number | Original sample number | Depth/m | Confining pressure (MPa) | Temperature (° C.) | Poisson's ratio | Elasticity modulus (MPa) | Differential stress (MPa) |
|---|---|---|---|---|---|---|---|---|
| D001 | YY6 | 1-67/89 | 3841.21 | 10 | 30 | 0.022 | 18794.7 | 46.1 |
| D002 | YY6 | 1-67/89 | 3841.21 | 20 | 60 | 0.106 | 22850.5 | 101.8 |
| D003 | YY6 | 1-67/89 | 3841.21 | 30 | 80 | 0.182 | 28849.6 | 136.6 |
| D004 | YY6 | 1-74/89 | 3842.76 | 50 | 100 | 0.211 | 33711.3 | 160.9 |
| D005 | YY9 | 8-37/126 | 2918.05 | 10 | 30 | 0.076 | 16389.3 | 43.4 |
| D006 | YY9 | 8-37/126 | 2919.05 | 20 | 60 | 0.14 | 23104.1 | 107 |
| D007 | YY9 | 8-36/126 | 2917.82 | 30 | 80 | 0.23 | 27461.8 | 172.5 |
| D008 | YY9 | 8-40/126 | 2918.56 | 50 | 100 | 0.27 | 31254.2 | 285.8 |
| D009 | YY3-1 | 1-69/112 | 4089.7 | 10 | 30 | 0.055 | 17259.5 | 72.5 |
| D010 | YY3-1 | 1-70/112 | 4089.88 | 20 | 60 | 0.144 | 21955.8 | 114 |
| D011 | YY3-1 | 1-69/112 | 4089.72 | 30 | 80 | 0.196 | 28288 | 147.4 |
| D012 | YY3-1 | 1-67/112 | 4089.46 | 50 | 100 | 0.247 | 33056.7 | 158.8 |
| D013 | YY1 | 6-58/108 | 3843.96 | 10 | 30 | 0.037 | 16788.3 | 56.8 |
| D014 | YY1 | 6-58/108 | 3843.98 | 20 | 60 | 0.123 | 22202 | 103.1 |
| D015 | YY1 | 6-59/108 | 3844.11 | 30 | 80 | 0.23 | 33978.7 | 158.9 |
| D016 | YY1 | 6-60/108 | 3844.23 | 50 | 100 | 0.451 | 36101 | 191.1 |
| D017 | YY2 | 4-69/135 | 4058.75 | 10 | 30 | 0.098 | 13856.4 | 55.8 |
| D018 | YY2 | 4-70/135 | 4058.99 | 20 | 60 | 0.146 | 20411.1 | 126.9 |
| D019 | YY2 | 4-69/135 | 4058.77 | 30 | 80 | 0.271 | 27711.9 | 152.3 |
| D020 | YY2 | 4-67/135 | 4058.54 | 50 | 100 | 0.351 | 35613.3 | 187.4 |

TABLE 2

Test results of the orientation of the maximum horizontal principal stress in Longmaxi segment I of Y2 well

| Well number | Horizon | Depth/m | Core orientation direction/° | Angle between the maximum principal stress and the marker line/° | Direction of the maximum horizontal principal stress/° |
|---|---|---|---|---|---|
| Y2 well | 1 | 4079.1 | 265.3 | 20 | 105.3 |
| | 2 | 4069.1 | 153.1 | 130 | 103.1 |
| | 3 | 4063.4 | 325.9 | 130 | 95.9 |

TABLE 3

Test results for the three principal stress magnitude in Longmaxi segment I of the study area

| Well number | Depth/m | Layer number | Vertical stress/MPa | Vertical stress gradient (MPa/100 m) | Maximum horizontal principal stress/MPa | Maximum horizontal principal stress gradient (MPa/100 m) | Minimum horizontal principal stress/MPa | Minimum horizontal principal stress gradient (MPa/100 m) |
|---|---|---|---|---|---|---|---|---|
| Y1 | 3847.0 | 3 | 95.01 | 2.47 | 100.95 | 2.62 | 82.30 | 2.14 |
| Y1 | 3802.6 | 8 | 93.19 | 2.45 | 97.72 | 2.57 | 86.16 | 2.27 |

TABLE 3-continued

Test results for the three principal stress magnitude in Longmaxi segment I of the study area

| Well number | Depth/m | Layer number | Vertical stress/MPa | Vertical stress gradient (MPa/100 m) | Maximum horizontal principal stress/MPa | Maximum horizontal principal stress gradient (MPa/100 m) | Minimum horizontal principal stress/MPa | Minimum horizontal principal stress gradient (MPa/100 m) |
|---|---|---|---|---|---|---|---|---|
| Y1 | 3844.2 | 3 | 96.78 | 2.52 | 100.59 | 2.61 | 90.55 | 2.36 |
| Y1 | 3834.8 | 5 | 94.10 | 2.45 | 99.06 | 2.58 | 88.94 | 2.32 |
| Y1 | 3839.7 | 4 | 95.95 | 2.50 | 99.85 | 2.60 | 89.82 | 2.34 |
| Y1 | 3854.1 | 3 | 95.09 | 2.47 | 100.70 | 2.61 | 90.59 | 2.35 |
| Y1 | 3861.2 | 3 | 95.84 | 2.48 | 100.78 | 2.61 | 91.09 | 2.36 |
| Y1 | 3868.3 | 1 | 96.10 | 2.48 | 100.12 | 2.59 | 92.01 | 2.38 |
| Y2 | 4058.8 | 6 | 101.38 | 2.50 | 105.67 | 2.60 | 92.73 | 2.28 |
| Y3 | 4089.5 | 3 | 101.03 | 2.47 | 105.64 | 2.58 | 91.85 | 2.25 |
| Y3 | 4079.7 | 4 | 100.18 | 2.44 | 105.00 | 2.57 | 91.36 | 2.24 |
| Y3 | 4081.5 | 3 | 101.22 | 2.50 | 106.47 | 2.61 | 91.40 | 2.24 |
| Y3 | 4080.7 | 4 | 101.58 | 2.51 | 106.15 | 2.60 | 91.51 | 2.24 |
| Y3 | 4096.9 | 3 | 105.60 | 2.55 | 112.63 | 2.75 | 91.78 | 2.24 |

Figure 2:
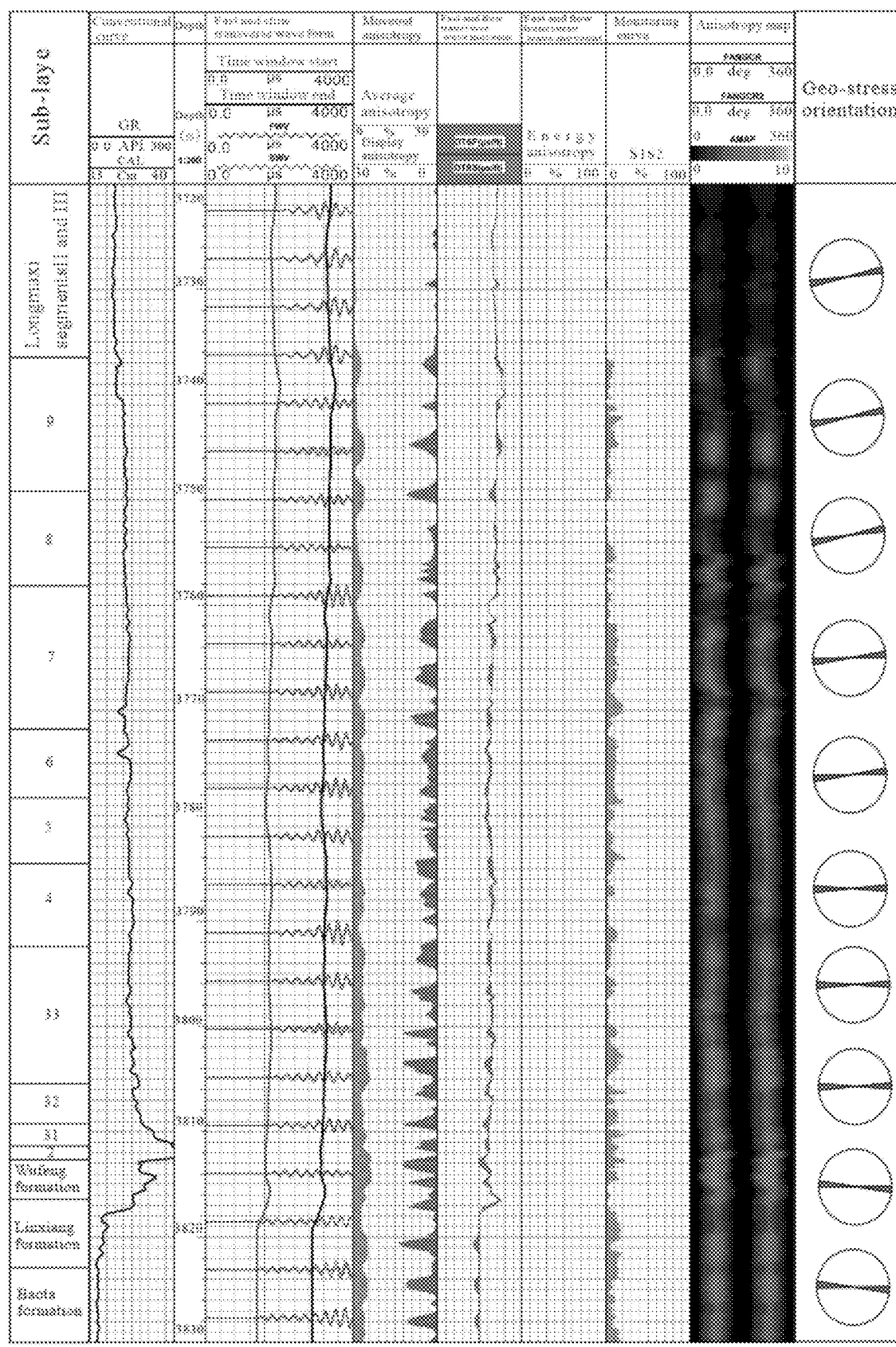
FIG. 2 illustrates a maximum horizontal principal stress orientation analysis of single-well in-situ geo-stress according to an embodiment of the present disclosure.
Figure 3:
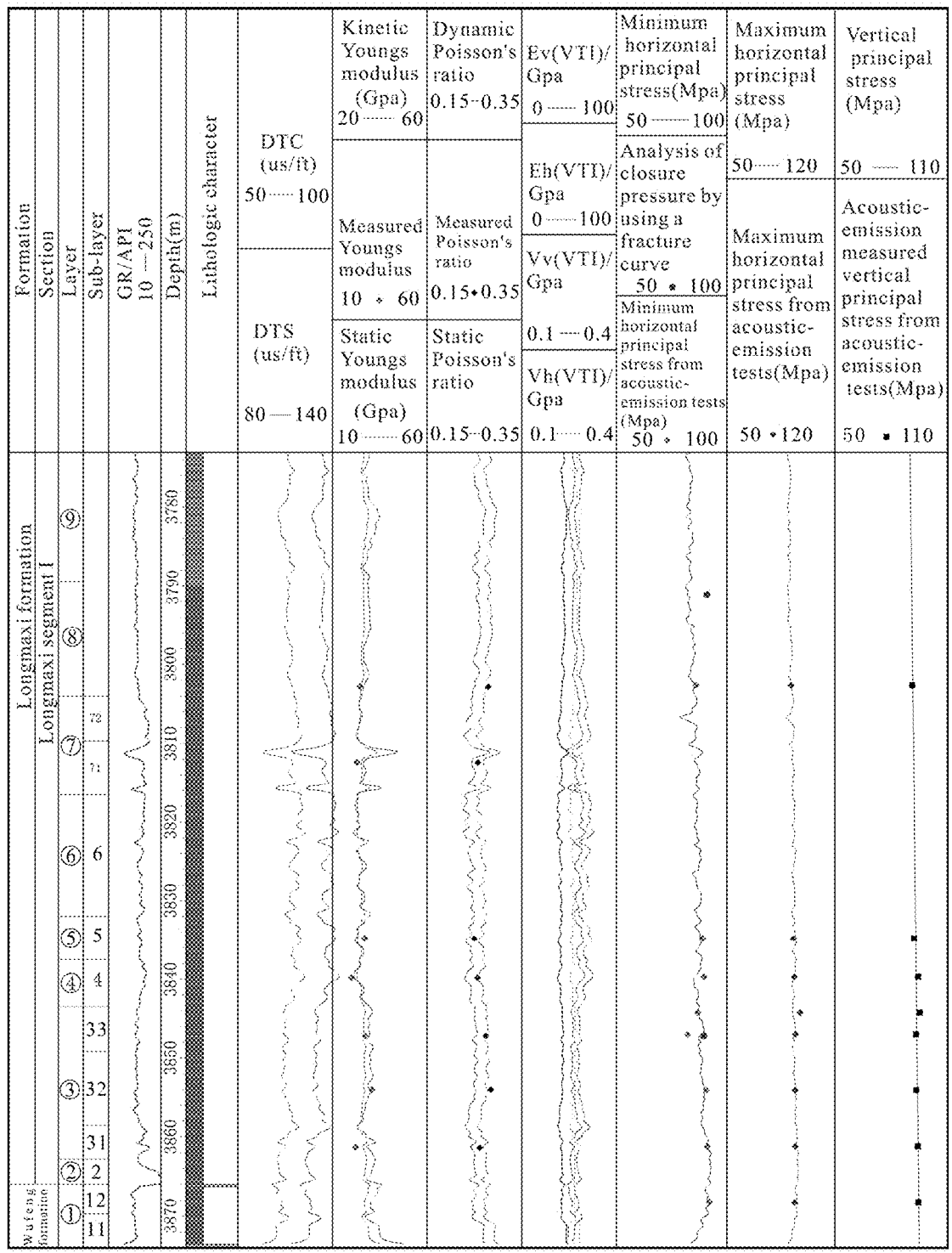
FIG. 3 shows interpretation results of continuity and magnitude of three principal geo-stress in the single well according to an embodiment of the present disclosure.
Figure 4:
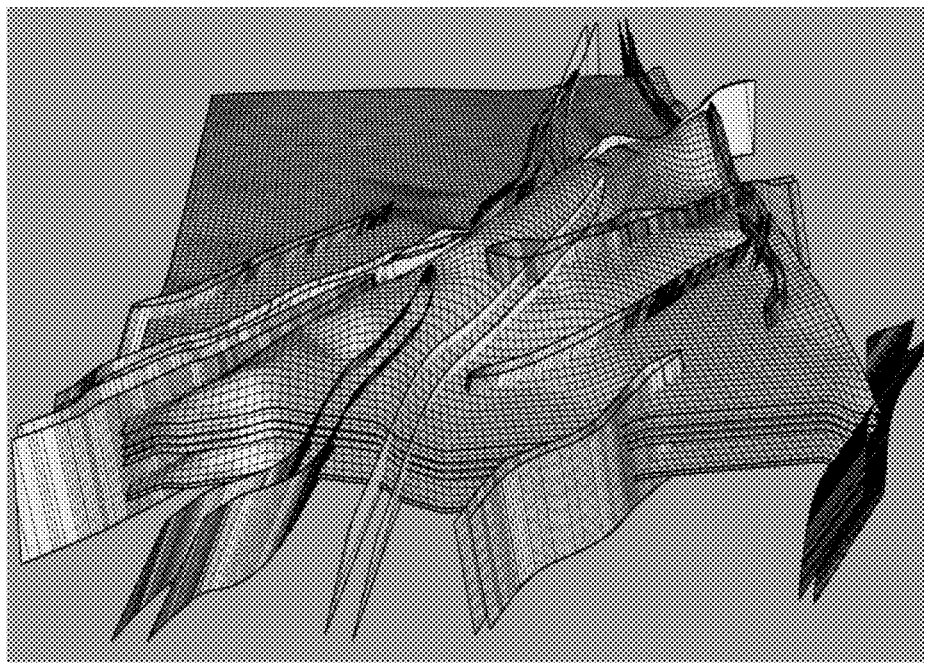
FIG. 4 schematically shows a fine geological model of a study area according to an embodiment of the present disclosure.

(S2) Interpretations of single-well profile rock mechanics and continuity of the in-situ geo-stress in magnitude and orientation are performed through combination of full-wave logging, multi-caliper logging, imaging logging, extraction of anisotropic transverse wave velocity from a cross-well seismic profile, and interpretation of magnitude of the in-situ geo-stress through a hydraulic fracturing construction curve, as shown in FIGS. 1-3.

(S3) A geological model is established by an idea of from a regional structure to a local structure and then to a single-well structure by using Petrel software based on stratigraphical model, tectonic surface model, and overlying strata model of a target layer.

Figure 5:
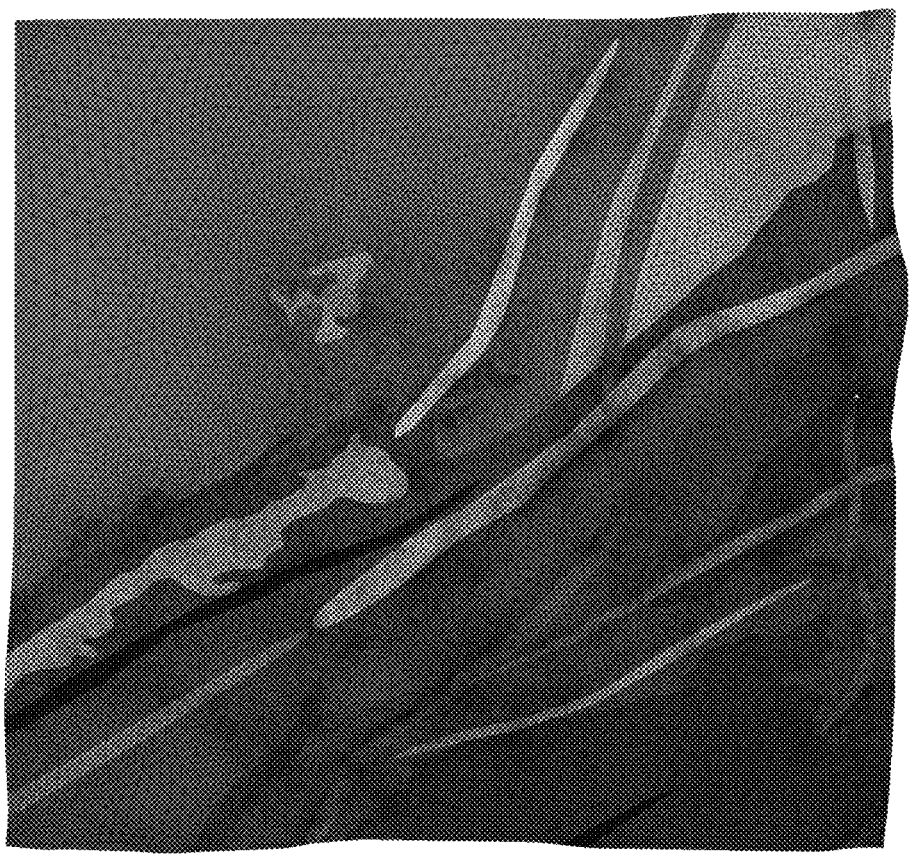
FIG. 5 shows of three-dimensional (3D) heterogeneous anisotropic rock mechanical properties in the study area according to an embodiment of the present disclosure.

(S4) Anisotropic sequential Gaussian stochastic simulation is performed to obtain three-dimensional (3D) heterogeneous rock mechanics parameter field distribution based on constraint of elastic parameter of 3D seismic attribute inversion in the study area, and test values of rock mechanics parameters of well sites in different tectonic zones. For a fault, 3D rock mechanics heterogeneous assignment within the fault is completed based on an equivalent elastic parameter assignment method for a fracture-containing rock medium, as shown in FIG. 5.

Figure 6:
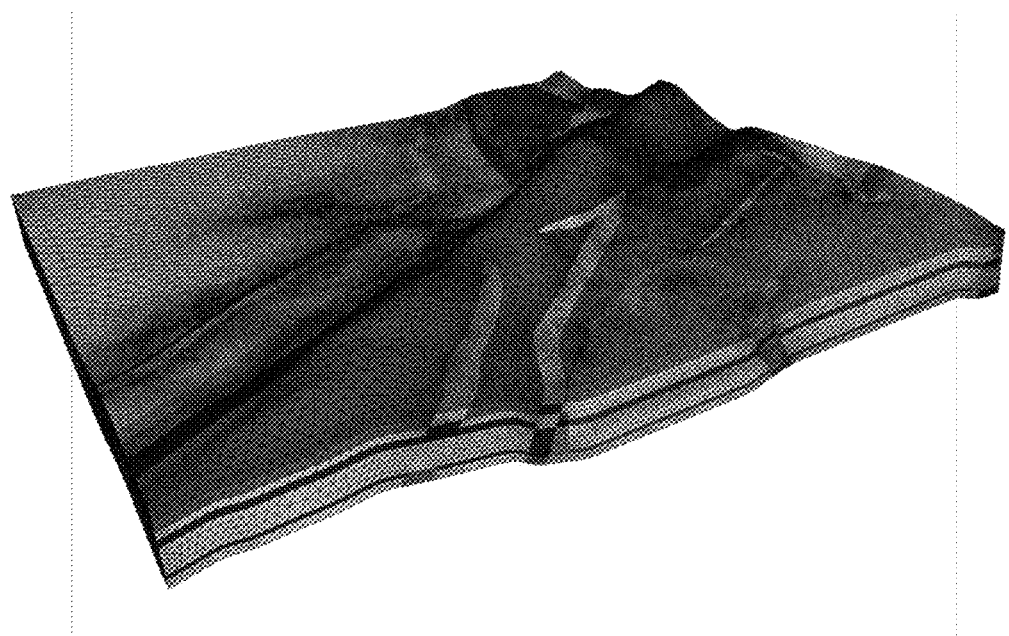
FIG. 6 schematically shows a 3D numerical model of the study area after mesh generation according to an embodiment of the present disclosure.
Figure 7A:
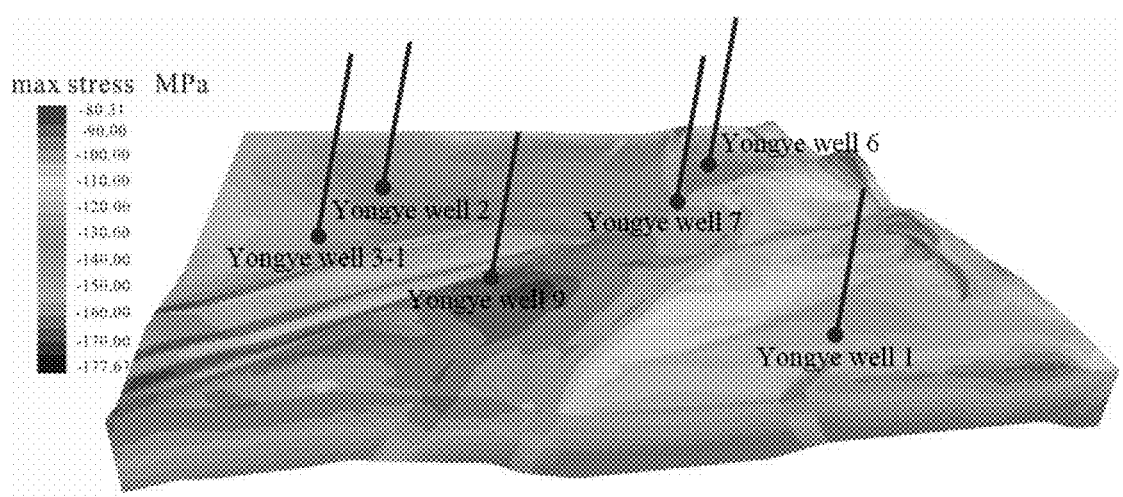
FIGS. 7a-7c schematically show three principal stress magnitude distribution of a 3D in-situ geo-stress in the study area according to an embodiment of the present disclosure.
Figure 7B:
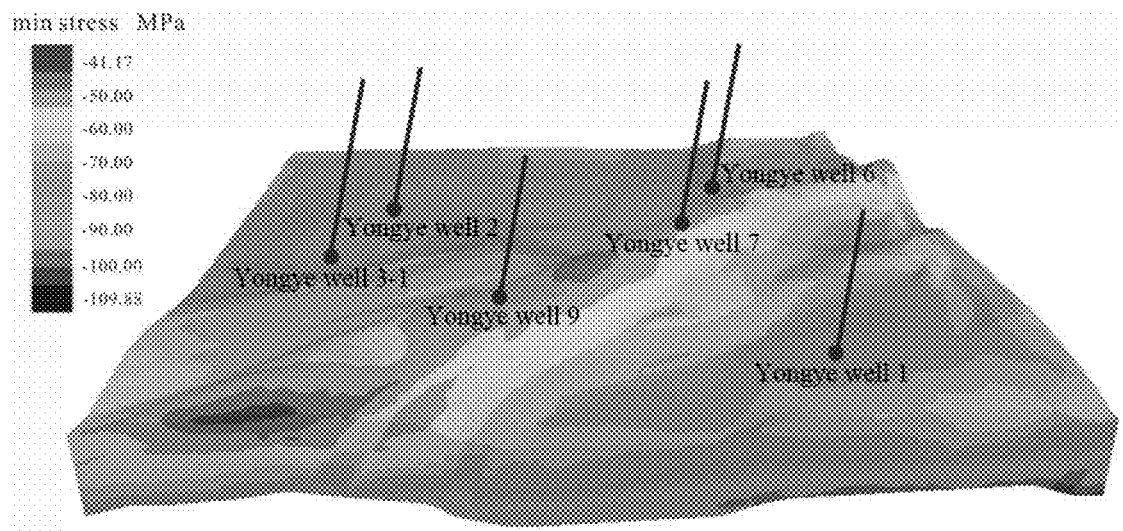
Figure 7C:
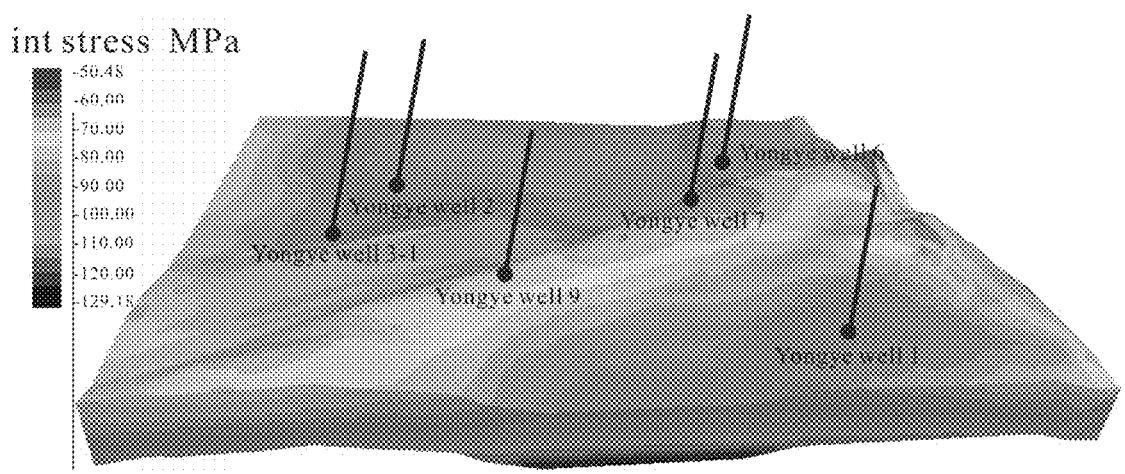

(S5) Mesh generation is performed by using adaptive mesh refinement, and a final numerical model is inputted into a Flac3D simulation and calculation software for simulation and prediction of distribution of in-situ geo-stress states in the study area. As shown in FIG. 6, loading boundary, mode, and initial size are set, and well site stress magnitude and orientation are used as fitting points for simulation, and meanwhile, a graphic processing unit (GPU) cloud computing platform is used for the prediction of distribution of the in-situ geo-stress states. As shown in FIG. 7, a stress structural index of the target layer is calculated, and the simulation and prediction of distribution of the structural geo-stress states is performed by the Flac3D simulation and calculation software through the following steps.

(S501) A 3D geological model is established by using the petrel software based on a geological element distribution map of the target layer.

(S502) Structural unit types and material property parameters are defined.

(S503) A mesh mathematical model is generated by using a Rhinoceros modeling software, and accuracy evaluation is performed on the mesh mathematical model.

(S504) Boundary conditions and external loads are loaded.

(S505) The mesh mathematical model is solved followed by result display and map output.

The geological map includes the tectonic depth map, the bottom iso-thickness map, and the stratigraphic petrographic distribution map.

Figure 9:
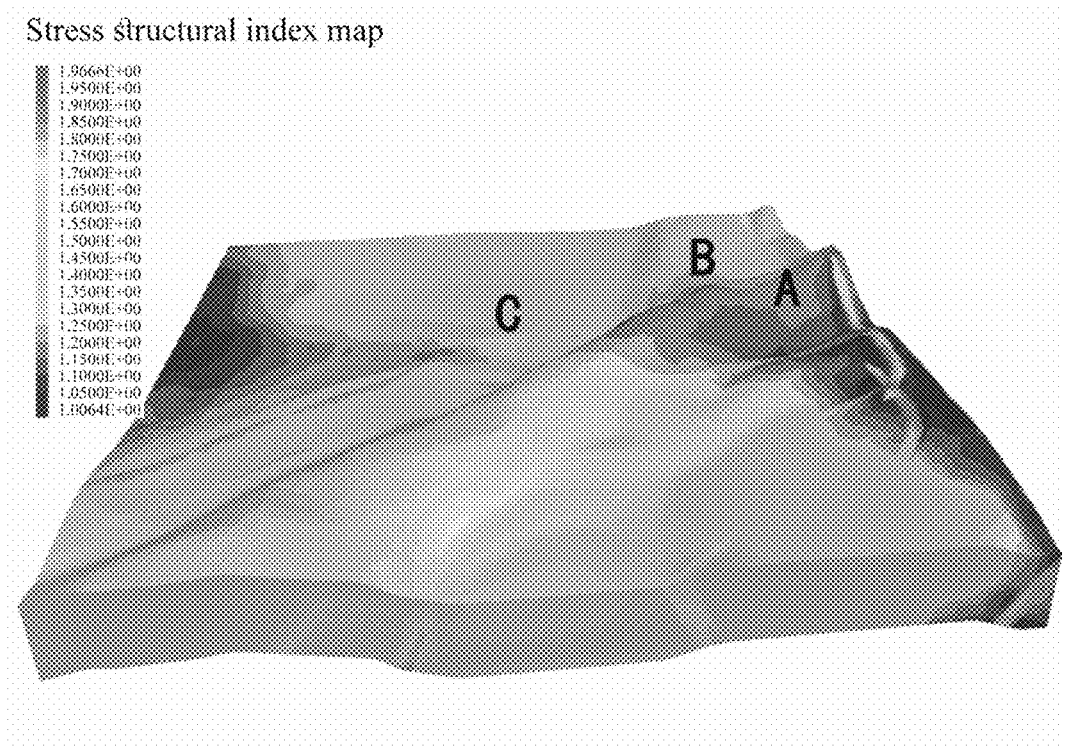
FIG. 9 schematically shows structural disturbance of the 3D in-situ geo-stress in different zones of the study area according to an embodiment of the present disclosure.
Figure 10:
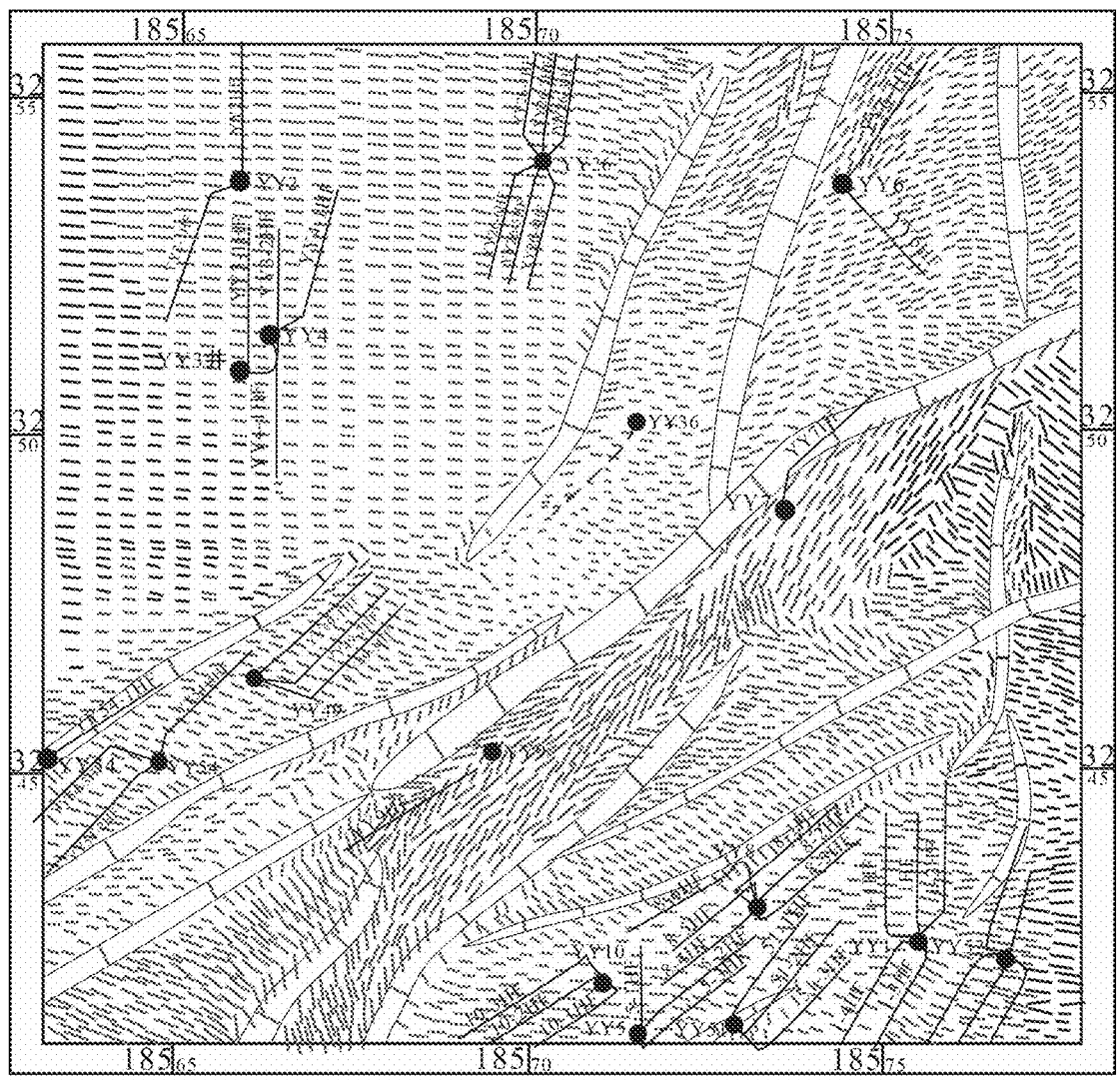
FIG. 10 schematically shows results of quantitative evaluation on disturbance characteristics of the in-situ geo-stress in the study area according to an embodiment of the present disclosure.
Figure 11:
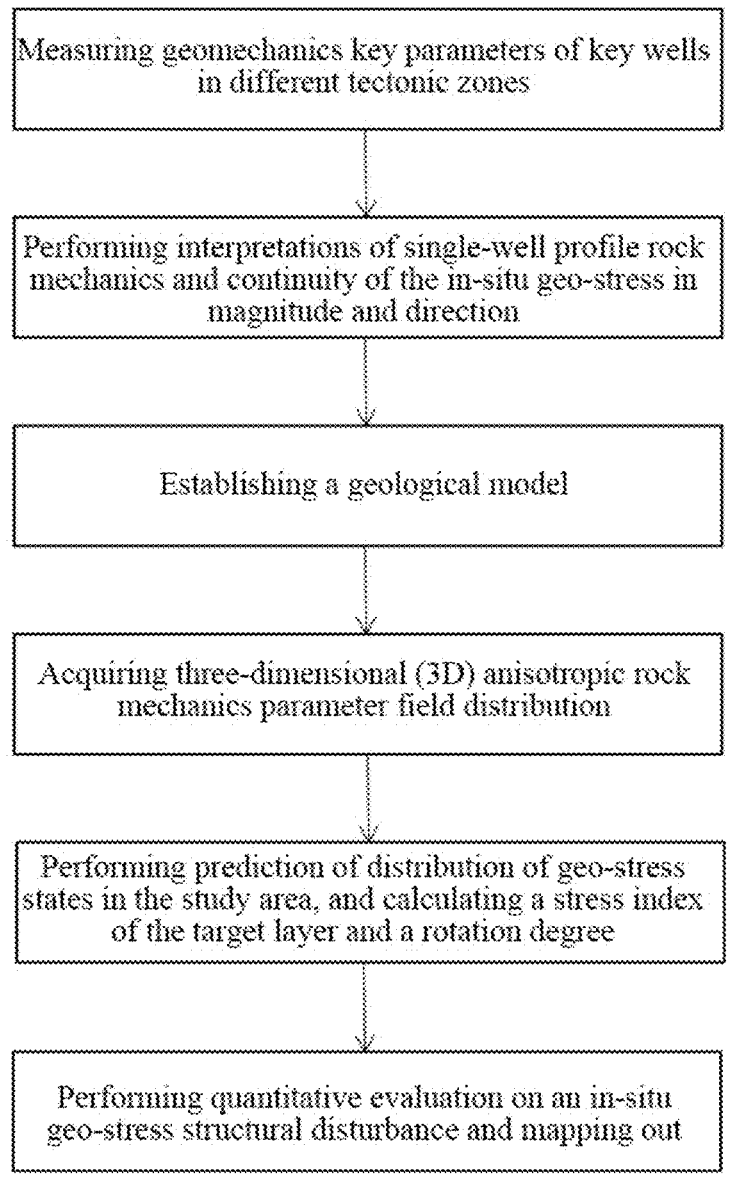
FIG. 11 is a flow chart of a method of evaluating structural disturbance of in-situ geo-stress according to an embodiment of the present disclosure.
Figure 12:
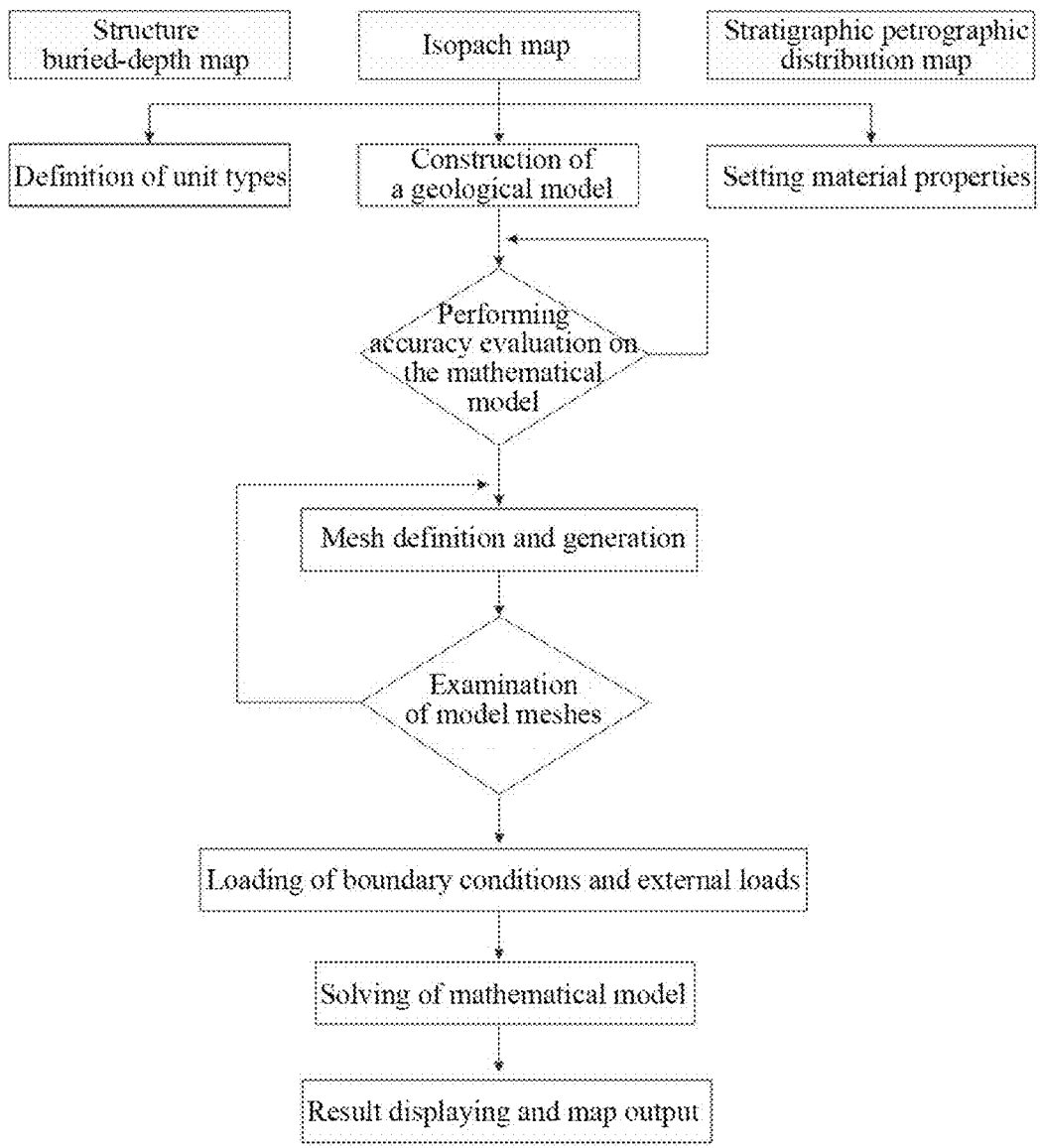
FIG. 12 is a flow chart illustrating in-situ geo-stress field numerical simulation performed by a Flac3D simulation and calculation software according to an embodiment of the present disclosure.

(S6) Quantitative evaluation is performed on an in-situ geo-stress structural disturbance in the study area, and graded and partitioned evaluation is performed on crustal-stress states and azimuth characteristics existing in a deep layer in a complex tectonic region. As shown in FIGS. 8 and 9, three principal stress structures and the maximum horizontal principal orientation disturbance features of the complex tectonic region are displayed on a map, which provides a reliable scientific basis for the optimization of drilling direction and hydraulic fracturing design of horizontal wells in the deep burial in the study area.

Embodiment 2

An embodiment illustrated in FIGS. 5, and 9-12 provides a method of quantitatively evaluating structural disturbance characteristics of present in-situ geo-stress in deep shale gas reservoirs, in which anisotropic sequential Gaussian stochastic simulation is performed to obtain 3D heterogeneous rock mechanics parameter field distribution based on constraint of an elastic parameter of 3D seismic attribute inversion in the study area, and test values of rock mechanics parameters of well sites in different tectonic zones and the interpretation of the single-well profile rock mechanics.

Based on the strain energy theory, the assignment method of equivalent elastic parameters of rock media containing fractures is established, and the 3D rock mechanics inhomogeneous assignment inside the fracture is completed to obtain a geological model.

By using the adaptive mesh refinement technology, the mesh is finer and the numerical model is more refined.

By using a 3D stress structural disturbance index, the disturbance characteristics and state of 3D stress structure in local complex tectonic zone and the dominant expansion direction and characteristics of hydraulic fractures due to the influence of tectonic deformation can be quantitatively evaluated, which provides a guidance for horizontal well trajectory optimization and hydraulic fracturing construction plan.

Described above are basic principles, features, and advantages of the present disclosure. It should be understood by those skilled in the art that the present disclosure is not limited to the above embodiments, and the above embodiments are merely illustrative of the principles of the present disclosure. Various variations and improvements made to the present disclosure without departing from the spirit and scope of the present disclosure shall fall within the scope of the present disclosure defined by the appended claims.

What is claimed is:

1. A method of evaluating structural disturbance characteristics of in-situ geo-stress in shale gas reservoirs, comprising:
   (S1) measuring geomechanics key parameters of key wells in different tectonic zones within a study area;
   (S2) performing interpretations of single-well profile rock mechanics and continuity of the in-situ geo-stress in magnitude and orientation through combination of full-wave logging, multi-caliper logging, imaging logging, extraction of anisotropic transverse wave velocity from a cross-well seismic profile, and interpretation of magnitude of the in-situ geo-stress through a hydraulic fracturing construction curve;
   (S3) establishing a geological model by using Petrel software based on stratigraphical model, tectonic surface model, and overlying strata model of a target layer;
   (S4) performing anisotropic sequential Gaussian stochastic simulation to obtain three-dimensional (3D) heterogeneous rock mechanics parameter field distribution based on constraint of an elastic parameter of 3D seismic attribute inversion in the study area, and test values of rock mechanics parameters of well sites in the different tectonic zones and the interpretations of the single-well profile rock mechanics;
   (S5) performing mesh generation by using adaptive mesh refinement; inputting a final numerical model into a Flac3D simulation and calculation software for simulation and prediction of distribution of in-situ geo-stress states in the study area; and calculating a stress structural index of the target layer and a rotation degree of a maximum horizontal principal stress;
   (S6) performing quantitative evaluation on an in-situ geo-stress structural disturbance in the study area; performing graded and partitioned evaluation on three principal stress states and orientation characteristics of the maximum horizontal principal stress existing in deep strata in a complex tectonic region; and displaying three principal stress structures of the complex tectonic region on a map.

2. The method of claim 1, wherein the geomechanics key parameters comprise rock mechanical properties, and three principal stress magnitude and orientation.

3. The method of claim 1, wherein in the step (S3), the geological model is established by adopting an idea of from a regional structure to a local structure and then to a single-well structure, which complies with principles of large-to-small construction, step-by-step constraint, and overall control.

4. The method of claim 1, wherein in the step (S4), for a fault, 3D rock mechanics heterogeneous assignment within the fault is completed based on an equivalent elastic parameter assignment method for a fracture-containing rock medium, combined with fracture density and fracture rate of a fracture.

5. The method of claim 1, wherein in the step (S5), after the final numerical model is input into the Flac3D simulation and calculation software, loading boundary, mode, and initial size are set, and well site stress magnitude and orientation are used as fitting points for simulation; and meanwhile, a graphic processing unit (GPU) cloud computing platform is used for the prediction of the distribution of the in-situ geo-stress states.

6. The method of claim 1, wherein in the step (S5), the simulation and prediction of the distribution of the in-situ geo-stress states is performed by the Flac3D simulation and calculation software through steps of:
   establishing a first 3D geological model based on a distribution map of geological elements of the target layer;
   establishing a second 3D geological model based on a geological element distribution map of the target layer;
   defining structural unit types and material property parameters;
   generating a mesh mathematical model; and performing accuracy evaluation on the mesh mathematical model;
   loading boundary conditions and external loads; and
   solving the mesh mathematical model followed by result display and map output.

7. The method of claim 6, wherein the geological model is built by using the Petrel software; and the mesh mathematical model is generated by using a Rhinoceros modeling software and is solved by using the Flac3D simulation and calculation software.

* * * * *